United States Patent
Dairymple et al.

(10) Patent No.: US 8,643,922 B2
(45) Date of Patent: Feb. 4, 2014

(54) GAMUT CLIPPING WITH PREPROCESSING

(75) Inventors: John Dairymple, Portland, OR (US);
James Zhixin Chang, Vancouver, WA (US); Chizu Watanabe, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 978 days.

(21) Appl. No.: 12/549,971

(22) Filed: Aug. 28, 2009

(65) Prior Publication Data
US 2011/0051207 A1 Mar. 3, 2011

Related U.S. Application Data

(63) Continuation-in-part of application No. 11/053,370, filed on Feb. 8, 2005, now Pat. No. 7,742,206.

(51) Int. Cl.
*G03F 3/08* (2006.01)

(52) U.S. Cl.
USPC .......................................... 358/518

(58) Field of Classification Search
USPC .......................................... 358/518
See application file for complete search history.

(56) References Cited

U.S. PATENT DOCUMENTS

| | | | |
|---|---|---|---|
| 5,450,216 A * | 9/1995 | Kasson | 358/518 |
| 6,414,690 B1 * | 7/2002 | Balasubramanian et al. | 345/589 |
| 2007/0091337 A1 * | 4/2007 | Morovic | 358/1.9 |

* cited by examiner

*Primary Examiner* — Marivelisse Santiago Cordero
*Assistant Examiner* — John Wallace
(74) *Attorney, Agent, or Firm* — Law Office of Gerald Maliszewski; Gerald Maliszewski (57) ABSTRACT

A method is provided for gamut clipping with preprocessing enabled as software instructions stored in a computer-readable medium and executable by a processor. The instructions provide a color in a color space defined by at least three attributes. If the color lies outside a gamut boundary in the first color space, a distance is measured from the color to the gamut boundary. In response to the measured distance, a weight is calculated for an attribute of the color. Then, it is determined if the attribute of the color is to be shifted. If so, an attribute shift amount is derived. The attribute shift amount of the color is modified by applying the weighting. The attribute of the first color is shifted by the weighted attribute shift amount, creating a post-processed color. The post-processed color is then clipped.

10 Claims, 4 Drawing Sheets

GAMUT CLIPPING WITH PREPROCESSING

RELATED APPLICATIONS

This application is a Continuation-in-Part of a patent application entitled, METHODS AND SYSTEMS FOR COLOR GAMUT ADJUSTMENT, invented by Dalrymple et al., Ser. No. 11/053,370, filed Feb. 8, 2005, and issued as U.S. Pat. No. 7,742,206 on Jun. 22, 2010, which is incorporated herein by reference.

BACKGROUND OF THE INVENTION

1. Field of the Invention

This invention generally relates to color rendering and, more particularly, to a method for preprocessing out-of-gamut colors prior to clipping.

2. Description of the Related Art

Figure 1:
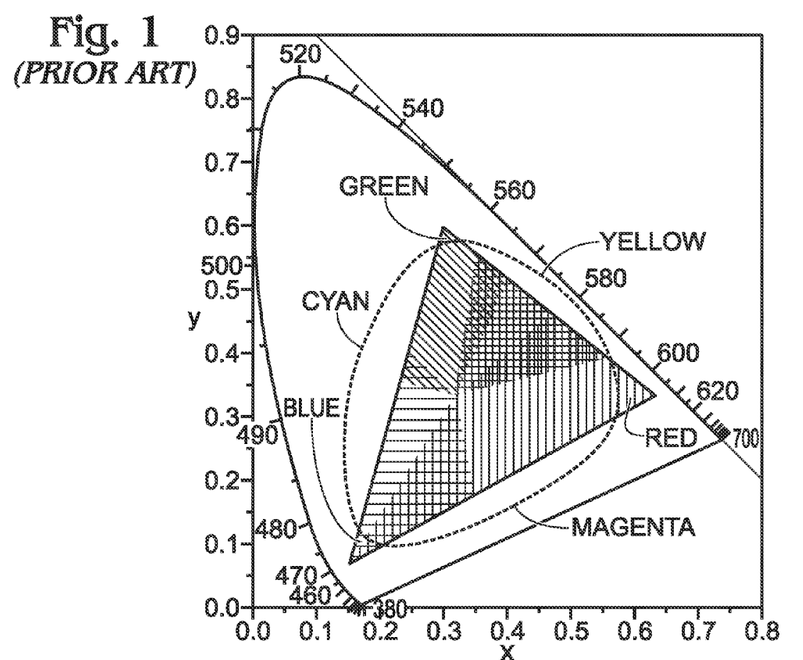
FIG. 1 is a two-dimensional projection depicting three-dimensional color gamuts (prior art).

FIG. 1 is a two-dimensional projection depicting three-dimensional color gamuts (prior art). The overall horseshoe shape is a projection of the entire range of possible chromaticities. That is, the projection represents an outer boundary of the range, or gamut, of all colors perceivable by the human visual system. The triangle and its interior represents the visual color gamut producible by a typical computer monitor, which creates color by additively mixing various amounts of red, green, and blue lights, where the intensities of these lights are controlled by red/green/blue (RGB) device signals. The monitor gamut does not fill the entire visual color space. The corners of the triangle are the primary colors for this monitor gamut. In the case of a cathode ray tube (CRT), they depend on the colors of the phosphors of the monitor. The oval shape drawn with dotted lines represents the gamut producible by a device such as a color printer that is controlled by cyan/magenta/yellow (CMY) or cyan/magenta/yellow/black (CMYK) device signals. In the case of a printer, the colors actually produced in response to these signals are dependent upon the colorant properties, the colorant application processes, the viewing illumination, and the print media. For a color output device, its gamut is a certain complete subset of colors that can be accurately represented by the device. The gamut conceptually consists of the set of human-perceivable colors produced by driving the device with all valid combinations of device signals.

Human-perceivable colors that cannot be produced by some particular color output device are said to be out-of-gamut for that device. For example, the pure red of a particular type of CRT or LCD monitor, produced by setting the RGB device signals to (R=max, G=0, B=0) may be out-of-gamut for of a particular type of printer, which may be controlled via CMYK device signals. The converse is also possible. That is, a printer might be able to produce some colors which a monitor cannot produce. While processing a digital image, the most convenient color model used is the RGB model. In practice, the human-perceivable color associated with each image RGB value is often (tacitly or explicitly) assumed to be the color produced by the user's display monitor, or the color obtained by applying formulae of a standardized specification such as sRGB. However, the printing of such an image typically requires transforming the image from its original RGB color space to a printer's CMYK color space.

The gamut of the CMYK printer would, ideally, be the same as the RGB monitor, with slightly different apexes, depending on both the exact properties of the printing substrate (such as paper), the printer's colorants (dyes or pigments, applied via inks, toners or the like), any halftoning or screening applied prior to physical marking of the media, and the light source under which the printed material is viewed. In practice however, due to the way the colorant layers interact with each other and with the substrate, and due to their non-ideal absorption spectra, the projection of the printer gamut is smaller and has rounded corners, as compared to the triangular projection of the monitor gamut. Alternately stated, when a CMYK printer gamut is overlaid on an RGB monitor gamut, the printer primary CMY colors typically fall outside of the RGB monitor gamut. In the lightness dimension (not shown in FIG. 1), the printer primary (CMY) and secondary (RGB) colors are usually darker than the corresponding RGB monitor secondary (CMY) and primary (RGB) colors.

Since the overlap of the RGB-monitor and CMYK-printer gamuts is imperfect, as conceptually depicted in FIG. 1, some colors in the image (i.e., colors within the RGB-monitor gamut) may need to be converted to different colors within the CMYK printer gamut, a process known in the art as gamut mapping. There are several algorithms in the art approximating this transformation, but all involve some compromise, since those colors are simply outside of the target device's capabilities. What is acceptable is dictated by the limitations of human perception.

A gamut mapping step is almost always necessary in a color reproduction process or pipeline. Gamut mapping methods can be subdivided into clipping techniques, vs. other techniques such as compression, companding, and the like. By definition, gamut clipping comprises deriving, from any given color point located outside the output device gamut, a corresponding color point on the gamut surface (not a point strictly interior to the gamut). This mapping is many to one. Generally, a multitude of out-of-gamut points—often, points lying along a continuous curve outside the gamut—result in the same clipped surface point.

Figure 2A:
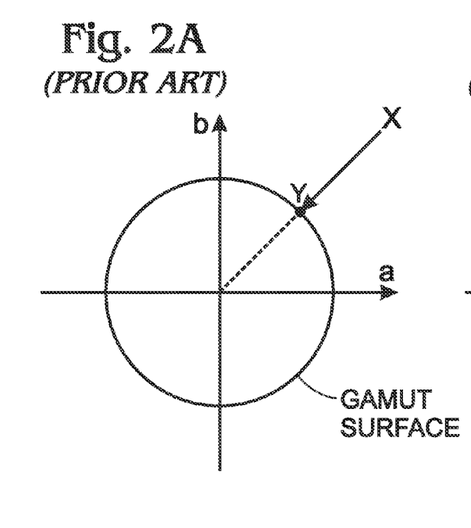
FIGS. 2A and 2B are diagrams depicting exemplary clipping processes (prior art).
Figure 2B:
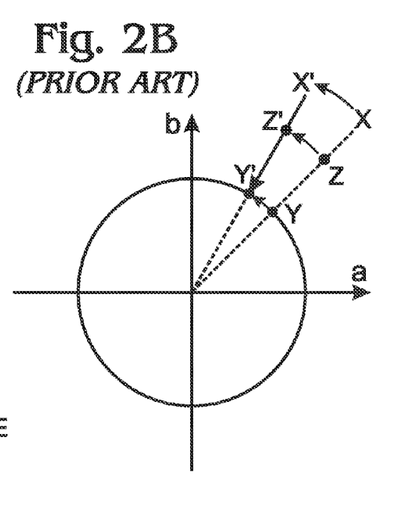

FIGS. 2A and 2B are diagrams depicting exemplary clipping processes (prior art). In these diagrams a color is represented in two-dimensional (2D) color space defined by exemplary attributes "a" and "b". For example, attributes "a" and "b" may be hue and lightness. As another example, in Commission Internationale de l'Eclairage (CIE) 1976 (L*, a*, b*) color space (abbreviated CIELAB), the "a" and "b" attributes may represent visual opponent responses along a visual red-green axis (CIE a*) and a visual yellow-blue axis (CIE b*), respectively. In FIG. 2A, the out-of-gamut color (point X) is simply clipped to the gamut surface along a line passing through point X and the origin of the (a, b) plane, resulting in clipped point Y. With this interpretation of "a" and "b," in FIG. 2B, the color at point X is initially moved—via an angular shift or rotation about the origin of the (a, b) plane—to point X' before it is clipped. In the CIELAB space, this angular rotation corresponds to a visual hue shift. The hue-shifting operation may be performed on the basis of predetermined user-specified aesthetic preferences.

The key difference between FIG. 2B and FIG. 2A is the hue shift. In FIG. 2B, every point on the line between X and Y is hue-shifted by the same amount, with X being shifted to X', Z to Z', and Y to Y'. Then, every point on the line X'Y' is clipped to a single point—Y'. This hue-shifting operation creates a problem in the treatment of colors near the gamut boundary. The classic definition of the gamut clipping algorithm specifies that in-gamut colors (colors on the line between the origin and Y) are not changed. However, the hue shift on the gamut boundary from Y to Y' creates a discontinuity in the color mapping. The colors close to Y and in-gamut are not hue-shifted, but those colors close to Y and out-of-gamut are shifted to points close to Y'.

There is an extremely wide variety of methods by which gamut clipping is carried out in the prior art. Any given clipping algorithm is necessarily tied to the specifics of the modeling approach, and the associated data structures used in representing the surface of the output device gamut. A large collection of these methods are categorized as 'constant-hue' gamut clipping, wherein the gamut is modeled in a cylindrical space, such as a hue-lightness-chroma space, and each out-of-gamut color is projected to some point on the gamut surface at the same hue angle as the initial color. One such method is detailed in the parent application entitled, METHODS AND SYSTEMS FOR COLOR GAMUT ADJUSTMENT, invented by Dalrymple et al., Ser. No. 11/053,370, filed Feb. 8, 2005, which is incorporated herein by reference.

A color-rendering process comprises the creation of a mapping that converts a desired color, as specified in a CIE device-independent color space, which models fundamental aspects of the color response of the human visual system, into a device signal vector, which controls the color produced by a color output device. In practice, this mapping is often embodied as a multidimensional lookup table, such as one within a 'B2A tag' within an ICC (International Color Consortium) profile. In that case, a color-rendering process is carried out at each point in the multidimensional table, and the color-rendering process becomes part of a color-profile generation process.

A color space may be defined by a number of characteristics or attributes. For example, the gamut of a device may be specified by hue, saturation, or brightness. Thus, a full color gamut must be represented in three dimensions (3D) of attributes. When a device signal vector is presented to an output device, the device produces a CIE color. CIE colors can be denoted by XYZ tristimulus coordinates, or by derived coordinates such as L*a*b* or the like. For example, electrophotographic (EP) color printers use CMYK colorants to produce color, and the device signal vectors are 4-tuples consisting of C, M, Y, K percentage amounts. Allowing these percentages to independently vary through their entire physical range (or within a 'valid' range, considering process limitations) results in a set of colors in CIE color space filling a volume called the color gamut of the device. EP devices in particular have a relatively small color gamut, compared to other devices such as inkjet or dye-sublimation printers, or compared to displays such as CRTs or LCDs.

In some situations, a desired CIE color intended to be reproduced on an output device or medium can be simply characterized as directly-measured relative colorimetry produced by a source device (such as a display), or alternatively as measured colorimetry of physical samples such as ones in a PANTONE® or similar swatch book or on a press sheet. These are all examples of a 'relative colorimetric' style of color reproduction—one of the standard ICC styles. Even with this straightforward definition, many such colors fall outside the output device gamut and must be clipped to the gamut surface.

In other cases, the source colorimetry is first deliberately modified to create the desired CIE color that is intended to be reproduced, see FIG. 2B. This is often done in providing ICC 'perceptual' or 'saturation' styles of color reproduction. Typically, a color reproduction designer performs such modifications for aesthetic or image-quality reasons.

Mapping software may separately provide the color-modification step as a 'rendeuing transform' that exposes many user-settable parameters for adjusting the rendering. The rendering transform adjusts the colorimetry associated with the points of the multidimensional lookup table which the software constructs.

Many settings of rendering transform parameters don't compress all colors of interest into the output gamut. Although details of the rendering transform are beyond the scope of this disclosure, it should be noted that in many applications, it is a one-to-one mapping. Hence, the software may also provide a separate clipping step at the end of the process, which restricts the source colors or rendered source colors to the set of colors producible by the output device.

After out-of-gamut colors have been clipped, the device signals required to produce the resulting clipped colors can be determined by many conventional methods, e.g., by inverting a signal-to-color model of the device on the fly, or by accessing a pre-computed inverse model. Alternatively, the gamut clipping operation itself can include steps for computing a device signal that produces the clipped color, by reference to a gamut surface model.

It would be advantageous if user-specified treatments for out-of-gamut colors could be incorporated into a gamut mapping clipping process.

It would be advantageous if a weighting operation could be applied to user-specified treatments of out-of-gamut colors incorporated into a gamut mapping clipping process, to address the discontinuity issues mentioned above in the discussion of FIG. 2B.

SUMMARY OF THE INVENTION

Disclosed herein is a method for providing user-controllable deviations from color attribute constancy in projecting out-of-gamut points to a gamut surface. Additionally, various attributes of colors that have already been modified by a rendering transform, and which are already known to be out of gamut, may be adjusted. Some exemplary attributes that may be modified include hue and lightness. The method tapers or weights the amount of additional adjustment based on the out-of-gamut color's geometric relationship to the gamut surface, e.g., a color's distance away from the gamut surface. Different embodiments may use different methods for assessing the initial geometric relationship and for deriving the adjustment, the tapering strategy, or other aspects, based on the geometric relationship.

For example, a multiplicative weight may be derived based on a color's distance away from a gamut surface along a path of constant hue and lightness, and this weight may be multiplied by hue and lightness offset amounts interpolated from ones specified by a user at a small number of 'anchor colors.' The weighted hue and lightness shift amounts are then respectively added to the hue and lightness of the starting color, and the resulting shifted color is then clipped using a constant-hue method.

Alternately stated, the method applies a pre-processing step that first shifts an initial out-of-gamut color to a second out-of-gamut color, before applying a gamut clipping method to the second out-of-gamut color. In practice, hue and lightness attribute shifts are useful pre-processes for creating desired color reproduction effects. The tapering action guarantees that the composite color mapping function (i.e., the combination of the rendering transform followed by the clipping transform) remains continuous across the gamut boundary.

This pre-processing method is used within the final (clipping) stage of the process, which performs the final restriction of out-of-gamut colors onto the surface of the output device gamut. Since this is a pre-process within the gamut clipping stage, it has no effect (by definition) on any rendered colors situated inside the output device gamut.

This method is applicable to the field of color reproduction for digitally-driven output devices, such as printers or visual displays. The subfield is color management based on CIE (Commission Internationale de l'Eclairage) colorimetry. Typically, the method is implemented in software color-profile-generation tools.

Accordingly, a method is provided for gamut clipping with preprocessing enabled as software instructions stored in a computer-readable medium and executable by a processor. The instructions provide an electromagnetic waveform representing a first color in a first color space defined by at least three attributes. If the first color lies outside a gamut boundary in the first color space, a distance is measured from the first color to the gamut boundary. In response to the measured distance, a weight is calculated for a first attribute of the first color. Then, it is determined if the first attribute of the first color is to be shifted. If so, a first attribute shift amount is derived. The first attribute shift amount of the first color is modified by applying the weighting. The first attribute of the first color is shifted by the weighted first attribute shift amount, creating a post-processed first color. The post-processed first color is then clipped and supplied as an electromagnetic waveform representing the clipped post-processed first color in the first color space.

In one aspect, the first color has a geometrically defined position in the first color space. The first attribute shift amount is derived by comparing the position of the first color to an anchor set defined by an anchor point and a function. The first attribute shift amount is calculated in response to inserting the first color position into the function.

Additional details of the above-described instructions and a computer processing device for preprocessing color gamut clipping are provided below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Figure 3:
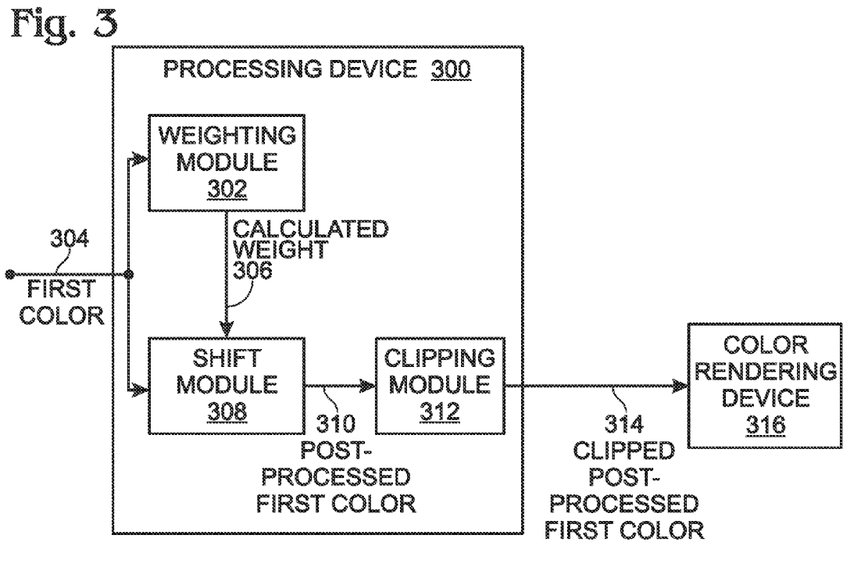
FIG. 3 is a schematic block diagram depicting a computer processing device for preprocessing color gamut clipping.
Figure 4:
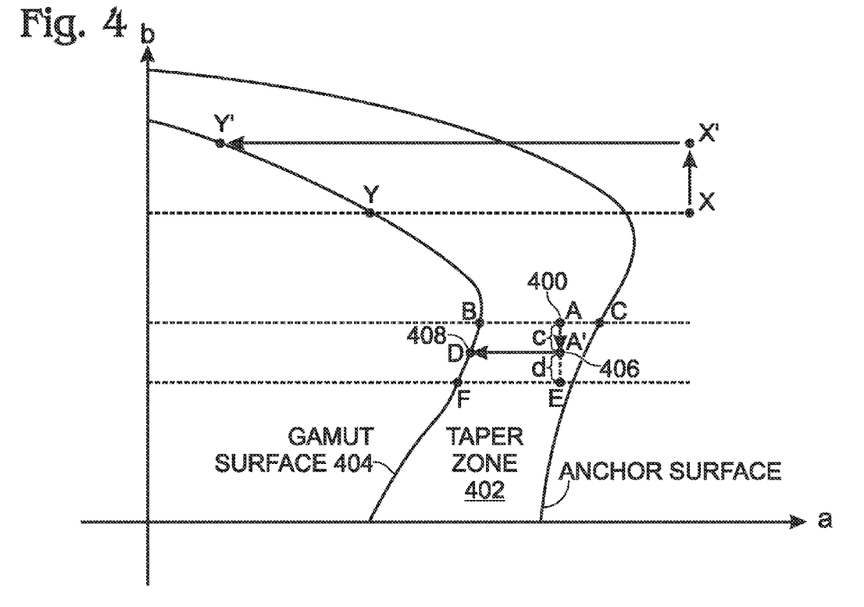
FIG. 4 is a diagram depicting the process of modifying a shift amount by the application of a weight.

FIG. 3 is a schematic block diagram depicting a computer processing device for preprocessing color gamut clipping. The processing device 300 comprises a weighting module 302 having an interface on line 304 to accept an electromagnetic waveform representing a first color in a first color space defined by at least three attributes. For example, the waveform may be a computer generated signal. The weighting module 302 measures a distance from the first color to the gamut boundary. If the first color lies outside a gamut boundary in the first color space, the weighting module 302 calculates a weight for a first attribute of the first color in response to the measured distance. The calculated weight is supplied on line 306. The process of shifting an out-of-gamut color is depicted in FIG. 4, as explained below, where the color at point X is moved to point X' prior to clipping. The additional process of weighting (weighting and shifting) is depicted in FIG. 4, where the color at point A is translated to point A', prior to clipping.

A shift module 308 has an interface on line 304 to accept the first color and an interface on line 306 to accept the calculated weight. The shift module 308 determines if the first attribute of the first color is to be shifted, and if so, derives a first attribute shift amount. The shift module modifies the first attribute shift amount of the first color by applying the weight to the first attribute shift amount, producing a weighted first attribute shift amount, and shifts the first attribute of the first color by the weighted first attribute shift amount, to create a post-processed first color supplied on line 310.

A clipping module 312 has an interface on line 310 to accept the post-processed first color. The clipping module 312 clips the post-processed first color and supplies an electromagnetic waveform representing the clipped post-processed first color in the first color space on line 314. More explicitly, the signal on line 314 supplies a mapped (or modified) color specification to a color rendering device 316, which calculates and puts on paper the CMYK combination amount of ink required to reproduce the mapped (or modified) color specification. The processing device 300 is not limited to the use of any particular clipping algorithm in clipping module 312.

FIG. 4 is a diagram depicting the process of modifying a shift amount by the application of a weight. For simplicity, the first color at point X is defined in 2D space with the color attributes "a" and "b". Here "a" and "b" are to be understood as generic placeholders for actual, specific attributes. For example, in FIG. 4, "a" may represent chroma and "b" may represent lightness. However, it should be understood that a color is more typically fully defined in 3D space. Thus, in FIG. 4 the third dimension (not shown) may, for example, be a constant value of hue. If the first color X were simply shifted, the color would be moved to the position at X', and X' would be clipped to the point Y'. The exact location of Y' on gamut surface 404 depends on the details of the clipping algorithm used. For instance, if the clipping algorithm preserves attribute "b" (lightness in this example) then the line X'Y' is parallel to the coordinate axis delineating attribute "a" (chroma in this example). In one aspect, out-of-gamut colors that are additionally outside the taper zone are treated in just this manner.

In contrast, the color at point A is weighted and shifted. That is, the shifting of the color at point A is modified by a weighting factor. For example, a taper zone may cover all out-of-gamut colors, or alternately as shown, the first color 400 (at point A) may lie within a more narrowly defined taper zone 402, adjacent the gamut surface 404. Then, the first color is moved by a process that applies weighting to modify a shift amount. That is, the first color is understood to have a geometrically defined position in the first color space (e.g., the coordinates A). The shift module derives the first attribute shift amount by comparing the position of the first color (e.g. A) to an anchor set defined by an anchor point and a function. The shift module calculates the first attribute shift amount in response to inserting the first color position into the function.

In this example, the anchor set is a surface, point C is a point on this surface, and "b" is the attribute being shifted. The function provides a weighted attribute shift amount $\Delta b$ to be applied to the "b" attribute of color A, as follows:

$$\Delta b = \|A-B\|/\|C-B\| \times [b(E)-b(A)] \qquad [\text{Eqn. 1}]$$

$$b(A') = b(A) + \Delta b \qquad [\text{Eqn. 2}]$$

where capital letters denote geometric position vectors (points) corresponding to colors, point E represents the shifted color that would result if weighting were not applied, b(A) and b(E) represent the respective amounts of the "b" attribute present in color A and E, b(A') represents amount of the "b" attibute present in shifted color A', and the double vertical bars denote computing a length or distance metric, such as a Euclidean, $L_p$, or $L_\infty$ norm.

The point representing the post-processed first color is 406 (A') and the point representing the clipped post-processed first color is 408 (D). Without weighting, the color at point A would be shifted to a point E, and clipped to point F. It should be understood that there are great numbers of ways to both express and define a gamut, gamut surface, taper zone, and anchor set. Advantageously, the above-described process of modifying a shift amount by the application of a weight avoids discontinuities in the mapping for points close to the gamut surface 404, e.g., near point B.

In one specific example, FIG. 4 depicts a radial slice of the gamut and taper zone at a constant hue angle. The anchor curve (intersection of the constant hue plane and the anchor surface) shown in FIG. 4 is defined by the chroma as a function of lightness (attribute "a" is chroma and "b" is lightness). As point C moves along the anchor curve, both lightness ("b") and chroma ("a") change. An anchor surface bounding a taper zone is derived by interpolation from a set of anchor points, and is a chroma surface that varies as a function of hue and lightness. That is, at any given hue angle, the anchor surface reduces to a curve of chroma (attribute "a"), which changes according to lightness ("b"). Alternately stated, FIG. 4 illustrates a constant hue slice of the color gamut and the anchor surface, where the 3-D color space is represented by lightness, hue, and chroma. In one aspect, the anchor surface is a set of triangular facets comprising a tessellation of several anchor points. In one aspect, unweighted attribute,shift amounts are specified at these anchor points.

An exemplary geometric measure associated with an out-of-gamut color is the fractional distance of the out-of-gamut color (A) from the gamut surface (B) to the anchor surface at constant hue and lightness (C). In Eqn. 1, this is expressed as $\|A-B\|/\|C-B\|$. This exemplary geometric measure has the value "0" at the gamut surface, the value "1" at anchor surface, and values greater than "1" at points beyond (more chromatic than) the anchor surface. Since weighting values are required to be within the unit interval (i.e., from 0 to 1), a weighting value is calculated from the geometric measure by clamping the geometric measure to the unit interval. If the "a" axis represents chroma and the "b" axis represents lightness, then the attribute that gets shifted in transporting color A to A' is lightness. Aesthetic (unweighted) attribute shifts are specified by the user as additive hue and lightness offsets at some of the anchor points, and these are extended to other points of the anchor surface by interpolation over the facets of the tessellation of the anchor points. For example, a Matlab 'griddata' function may be used to perform these tessellating and interpolating operations.

For each input color provided, a corresponding point on the anchor surface is determined, and an unweighted hue and/or lightness offset amount is derived at that corresponding anchor-surface point via the tessellation-based interpolation. Weighting is applied by multiplying the weight value (derived from the geometric measure) by the (unweighted) hue/lightness offset amounts derived for the corresponding anchor-surface point. Finally, hue/lightness attributes of the input color are modified by adding the weighted hue/lightness offsets to the hue/lightness of the input color, resulting in a post-processed first color.

The shift amounts on the anchor surface are essentially specified by the user. One way to do this is to allow the user to specify the shift amounts for any attributes such as hue, chroma, lightness, etc., or any combination of attributes, on a finite set of anchor points. Then, the anchor surface comprises the set of triangular facets obtained by tessellating the set of anchor points defined by the user. It is to be understood that a 'point on the anchor surface' may or may not be one of the 'anchor points' specified by the user.

The unweighted shift amount for any attributes for any point on the anchor surface can be obtained by interpolation over the triangular facets of user-specified (unweighted) shift amounts at the user-specified anchor points. The unweighted shift amounts specified by the user on the anchor surface are multiplied by weights that depend on the geometric position of the color, resulting in modified (weighted) shift amounts, and then the modified shift amounts are applied to the input color.

In one aspect, the position-dependent weight for input colors that happen to lie on the anchor surface (or beyond it) is made equal to 1 to honor the user-specified shift amounts. The weight for the input colors that happen to lie on the gamut surface is made equal to 0 in order to preserve the continuity of the color mapping across the gamut boundary. In the taper (buffer) zone between the gamut surface and the anchor surface, the weights would take on values between 0 and 1. In one aspect, the weight to be applied for any input color may be determined as a monotone function of the relative position of the input color point with respect to the gamut surface and the anchor surface. Clearly, a wide array of monotone functions would be applicable for the purpose of converting the relative position into a suitable weight. In another aspect, the function for converting the relative position into a weight need not be monotone, as long as the function is continuous and smoothly approaches 0 as the relative position approaches 0.

In the example illustrated by FIG. 4, the attribute being shifted is lightness. The hue may also be shifted, but FIG. 4 does not depict the hue dimension. The user-defined shift amount is specified at the anchor surface, which contains point C. Also in the example illustrated in FIG. 4, the distances used to calculate the weights are measured along a line of constant hue and lightness, in the chroma dimension only.

Returning to FIG. 3, in one aspect the weighting module 302 measures the distance from the first color to a gamut boundary representing an attribute limitation of a color rendering device 316. The clipping module 312 supplies a signal representing the clipped post-processed first color to the color rendering device 316. For example, the color rendering device may be an electronic monitor or paper media printer. After the color is clipped, a mapped color specification with modified attribute values is created. This mapped color specification is processed by color rendering device 316 to obtain a colorant combination specification (e.g., CMYK). Color rendering device 316 may be a printer applying a specified CMYK colorant amount on paper or an RGB electronic display monitor.

The modules and components depicted in FIG. 3 can be enabled in hardware using logic state machines and/or combination logic circuitry. Alternately, portions of these modules may be enabled as software instructions stored in memory that can be executed by a microprocessor.

Figure 5:
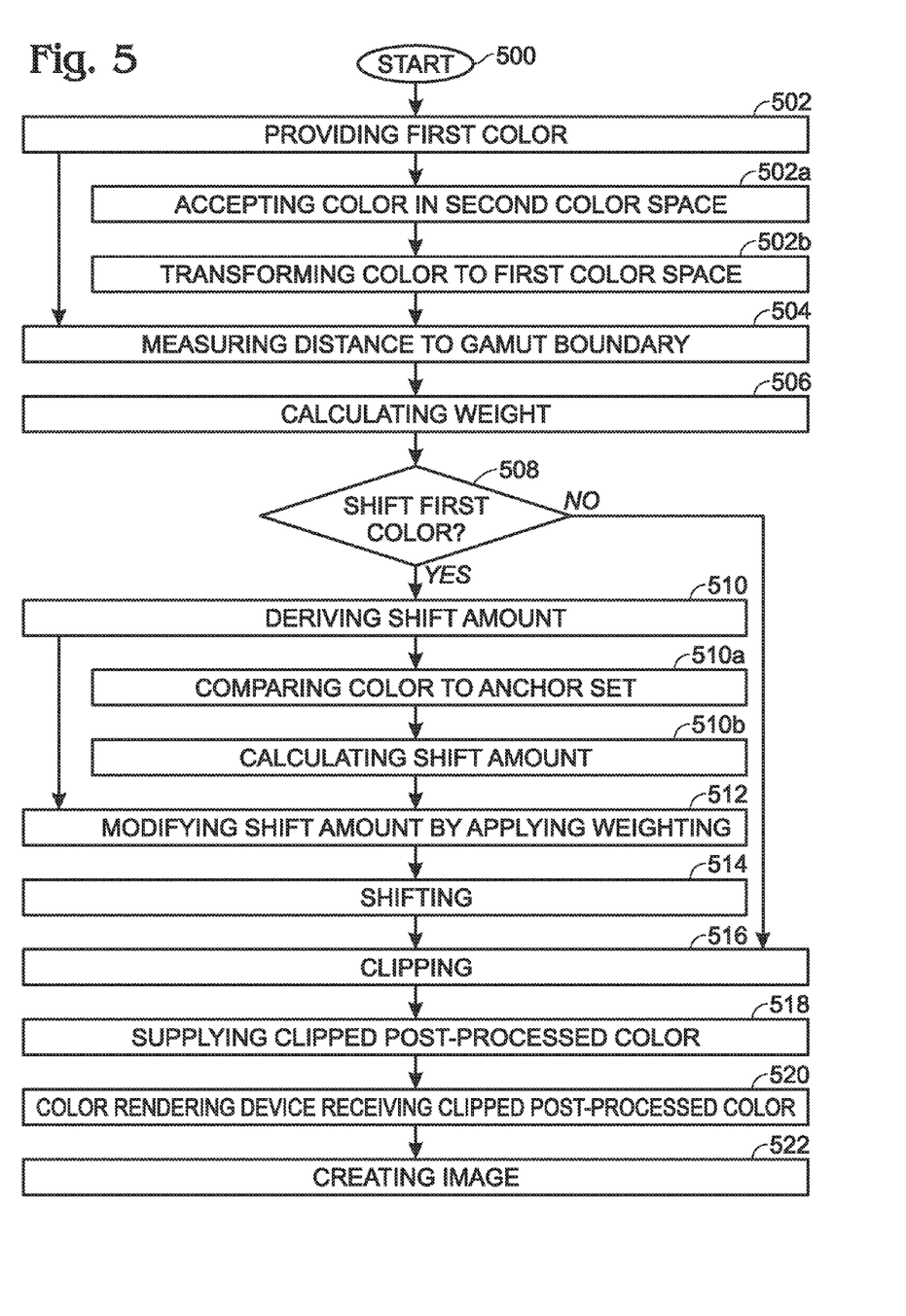
FIG. 5 is a flowchart illustrating a method for gamut clipping with preprocessing enabled as software instructions stored in a computer-readable medium and executable by a processor.

FIG. 5 is a flowchart illustrating a method for gamut clipping with preprocessing enabled as software instructions stored in a computer-readable medium and executable by a processor. Although the method is depicted as a sequence of numbered steps for clarity, the numbering does not necessarily dictate the order of the steps. It should be understood that some of these steps may be skipped performed in parallel, or performed without the requirement of maintaining a strict order of sequence. The method starts at Step 500.

Step 502 provides an electromagnetic waveform representing a first color in a first color space defined by at least three attributes. If the first color lies outside a gamut boundary in the first color space, Step 504 measures a distance from the first color to the gamut boundary. For example, in FIG. 4 the distance measured for the color at A is $\|A-B\|/\|C-B\|$.

In response to the measured distance, Step 506 calculates a weight for a first attribute of the first color. Alternately stated, Step 506 calculates a weight to be applied to a shift amount for a first attribute of the first color. For example, calculating the weight may comprise applying a continuous function to the measured distance. Step 508 determines if the first attribute of the first color is to be shifted. Step 510 derives a first attribute shift amount. Step 512 modifies the first attribute shift amount of the first color by applying the weighting. Step 514 shifts the first attribute of the first color by the weighted first attribute shift amount, creating a post-processed first color. Step 516 clips the post-processed first color, and Step 518 supplies an electromagnetic waveform representing the clipped post-processed first color in the first color space.

In one aspect, providing the first color in Step 502 includes the following substeps. Step 502a accepts the first color defined in a second color space having at least three dimensions. Step 502b transforms the first color to the first color space.

In another aspect, providing the first color in the first color space (Step 502) includes providing a first color with a geometrically defined position in the first color space. Then, deriving the first attribute shift amount in Step 510 includes substeps. Step 510a compares the position of the first color to an anchor set defined by an anchor point and a function. Step 510b calculates the first attribute shift amount in response to inserting the first color position into the function, see FIG. 4. Alternately stated, Step 510a associates a point of an anchor set with the first color, where the anchor set is defined by an anchor point and a function. Step 510b calculates a first attribute shift amount for the point of the anchor set associated at step 510a with the first color; see FIG. 4 and Eqn. 1. For example, Step 510a may compare n attributes of the first color to an n-dimensional anchor set, and may associate with the first color a point of the anchor set that is nearest in some sense to the first color. Typically, the value of n varies from 1 to 3. In one example, see FIG. 6 for additional details, Step 510a compares hue and lightness attributes of the first color to an anchor set defined by at least one anchor point defined by hue and lightness values, and associates with the first color that point of the anchor set having the same hue and lightness as the first color. In this example, n=2. Likewise, clipping the post-processed first color in Step 516 may include the use of a constant-hue method.

For perceptual attributes, the upper limit of the value n is typically 3 in practice, since the normal human color vision system only has 3 distinct sensory channels (cone types). However, if the received color data includes extra appended information, in addition to the perception-based color coordinates, then this information may include other shiftable attributes. Hence, the upper limit of n is not necessarily limited to 3.

More generally, measuring the distance from the first color to the gamut boundary in Step 504 includes the first attribute being defined by one or more of the following attributes: hue, lightness, chroma, colorfulness, saturation, brightness, and combinations of the above-mentioned attributes. Likewise, the anchor set of Step 510 can be defined with these attributes. Note: those skilled in the art would understand that a color can be defined with other, unmentioned attributes. Furthermore, there are a wide variety of methods by which each input color may be associated with a corresponding point on the anchor surface as recited in Step 510a.

In another aspect, measuring the distance from the first color to the gamut boundary in Step 504 may include measuring the distance from the first color to a gamut boundary representing an attribute limitation of a color rendering device. Then, Step 518 supplies the electromagnetic waveform representing the clipped post-processed first color to the color rendering device. In Step 520 a color rendering device receives the electromagnetic waveform representing the clipped post-processed first color. In Step 522 the color rendering device creates a physical medium or electronic image reproducing the clipped post-processed first color.

In a different aspect, if Step 508 determines that the first attribute of the first color is not to be shifted, Step 516 clips the first color, creating a clipped first color, which is supplied in Step 518.

Figure 6:
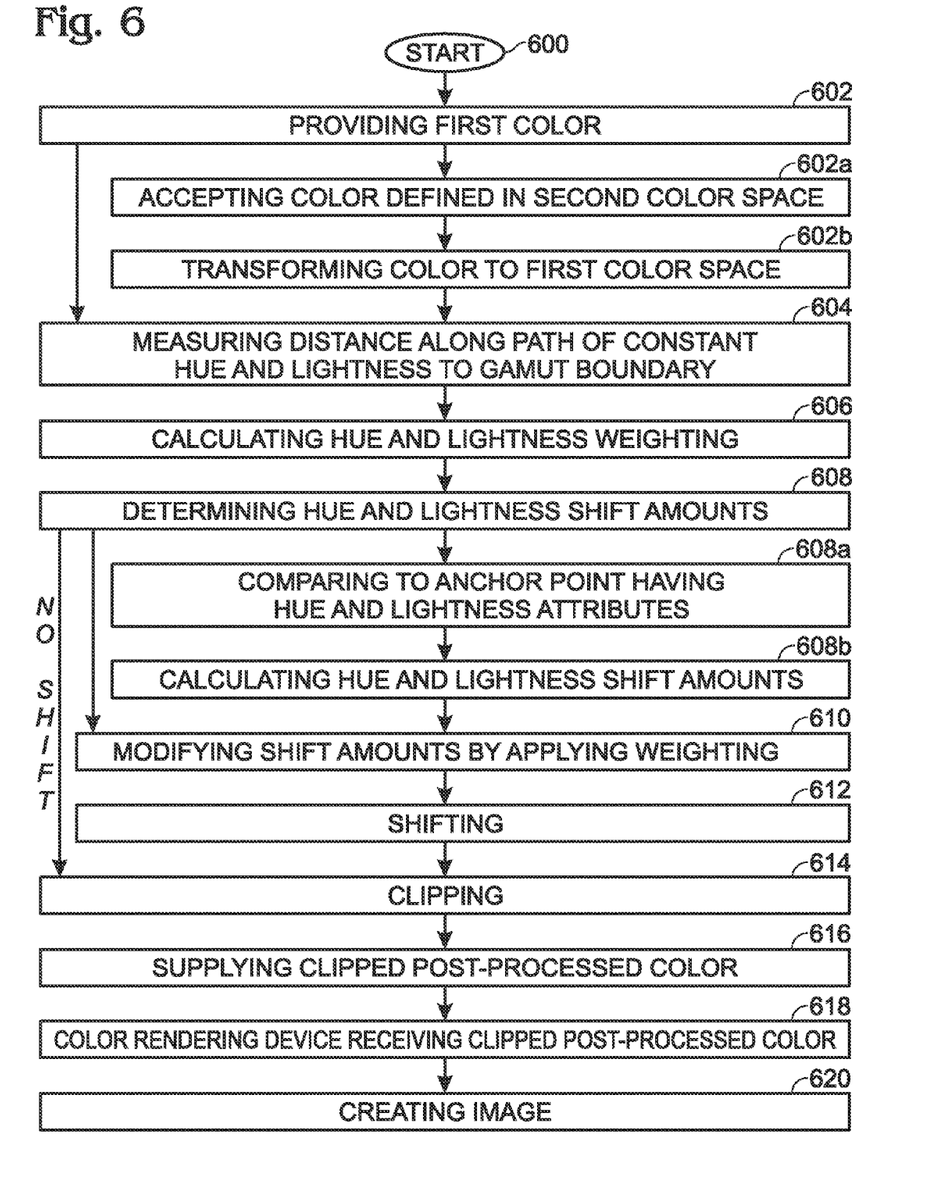
FIG. 6 is a flowchart depicting an exemplary method for gamut clipping with preprocessing.

FIG. 6 is a flowchart depicting an exemplary method for gamut clipping with preprocessing. The method starts at Step 600. Step 602 provides an electromagnetic waveform representing a first color having a geometric position in a color space defined by at least three attributes. If the first color lies outside a gamut boundary, Step 604 measures a distance along a path of constant hue and lightness attributes to the gamut boundary. In response to the measured distance, Step 606 calculates a weight for the hue and lightness attributes of the first color. Step 608 determines hue and lightness attribute shift amounts. Step 610 modifies the hue and lightness attribute shift amounts of by applying the weighting. Step 612 shifts the hue and lightness attributes of the first color by the weighted first attribute shift amount, creating a post-processed first color. Step 614 clips the post-processed first color, and Step 616 supplies an electromagnetic waveform representing the clipped post-processed first color in the first color space.

In one aspect, determining the hue and lightness attribute shift amounts in Step 608 includes substeps. Step 608a compares the position of the first color to an anchor set defined by an anchor point having a geometric position in a color space defined by hue and lightness attributes, and a function. Step 608b calculates the hue and lightness attribute shift amount in response to inserting the first color position into the function.

In another aspect, providing the first color in Step 602 includes the following substeps. Step 602a accepts the first color defined in a second color space having at least three dimensions. Step 602b transforms the first color to the first color space.

In a different aspect, measuring the distance along the path of constant hue and lightness attributes to the gamut boundary in Step 604 includes measuring the distance from the first color to a gamut boundary representing the maximum chroma producible by a color rendering device at each hue and lightness. Then, Step 616 supplies a signal representing the clipped post-processed first color to the color rendering device. In Step 618 a color rendering device receives the electromagnetic waveform representing the clipped post-processed first color. In Step 620 the color rendering device creates an image reproducing the clipped post-processed first color.

If Step 608 determines-that the hue and lightness attributes of the first color are not to be shifted, Step 614 clips the first color, creating a clipped first color, and Step 616 supplies an electromagnetic waveform representing the clipped first color.

A processing device and computer implemented method have been provided for preprocessing a color prior to clipping. Explicit examples of attribute types and anchor set functions have been given to illustrate the invention. However, the invention is not limited to merely these examples. Other variations and embodiments of the invention will occur to those skilled in the art.

We claim:

1. In a computer system, a method for gamut clipping with preprocessing enabled as software instructions stored in a computer-readable medium and executable by a processor, the method comprising:
   providing an electromagnetic waveform representing a first color having a geometric position in a color space defined by at least three attributes;
   when the first color lies outside a device gamut boundary defining an attribute limitation of a color rendering device, measuring a distance along a path of constant hue and lightness attributes from the first color to the device gamut boundary;
   in response to measuring the distance along the path of constant hue and lightness attributes from the first color to the device gamut boundary, calculating a weight for the hue and lightness attributes of the first color;
   determining hue and lightness attribute shift amounts;
   modifying the hue and lightness attribute shift amounts of by applying the weighting;
   shifting the hue and lightness attributes of the first color by the weighted hue and lightness attribute shift amounts, creating a post-processed first color;
   clipping the post-processed first color; and,
   supplying an electromagnetic waveform representing the clipped post-processed first color in the first color space.

2. The method of claim 1 wherein determining the hue and lightness attribute shift amounts includes:
   comparing the position of the first color to an anchor set defined by an anchor point having a geometric position in a color space defined by hue and lightness attributes, and a function; and,
   calculating the hue and lightness attribute shift amount in response to inserting the first color position into the function.

3. The method of claim 2 wherein providing the first color includes:
   accepting the first color defined in a second color space having at least three dimensions; and,
   transforming the first color to the first color space.

4. The method of claim 1 wherein measuring the distance along the path of constant hue and lightness attributes from the first color to the device gamut boundary includes measuring the distance from the first color to a device gamut boundary representing a maximum chroma producible by the color rendering device at each hue and lightness; and,
   wherein supplying the electromagnetic waveform representing the clipped post-processed first color includes supplying a signal representing the clipped post-processed first color to the color rendering device.

5. The method of claim 4 further comprising:
   the color rendering device receiving the electromagnetic waveform representing the clipped post-processed first color; and,
   the color rendering device creating an image reproducing the clipped post-processed first color.

6. The method of claim 1 further comprising:
   when it is determined that the hue and lightness attributes of the first color are not to be shifted, clipping the first color, creating a clipped first color; and,
   supplying an electromagnetic waveform representing the clipped first color.

7. A computer-readable set of instruction stored in a non-transitory memory for preprocessing color gamut clipping, the instructions comprising:
   a weighting module having an interface to accept an electromagnetic waveform representing a first color in a first color space defined by at least three attributes, the weighting module measuring a distance along a path of constant hue and lightness attributes from the first color to a device gamut boundary defining an attribute limitation for a color rendering device when the first color lies outside the device gamut boundary in the first color space, and calculating a weight for the hue and lightness attributes of the first color in response to measuring the distance from the first color to the device gamut boundary;
   a shift module having an interface to accept the first color and the calculated weight, the shift module determining if the hue and lightness attributes of the first color are to be shifted, deriving shift amounts for the hue and lightness attributes of the first color, modifying the hue and lightness attribute shift amounts of the first color by applying the weighting, and shifting the hue and lightness attributes of the first color by the weighted hue and lightness attribute shift amounts, creating a post-processed first color; and, a clipping module having an interface to accept the post-processed first color, the clipping module clipping the post-processed first color and supplying an electromagnetic waveform representing the clipped post-processed first color in the first color space.

8. The instructions of claim 7 wherein the shift module derives the hue and lightness attribute shift amounts by comparing the position of the first color to an anchor set defined by an anchor point having a geometric position in a color space defined by hue and lightness attributes, and a function, and calculating the hue and lightness attribute shift amounts in response to inserting the first color position into the function.

9. The instructions of claim 7 wherein the clipping module supplies a signal representing the clipped post-processed first color to the color rendering device.

10. The instructions of claim 7 wherein the weighting module measures the distance from the first color to a device gamut boundary representing a maximum chroma producible by the color rendering device at each hue and lightness.

* * * * *